United States Patent [19]

Ball et al.

[11] 4,305,277
[45] Dec. 15, 1981

[54] HYDROSTATIC TESTER FOR PLASTIC LINED PIPE AND FIBERGLASS PIPE

[76] Inventors: Frank C. Ball, 5620 Campo Walk, Long Beach, Calif. 90803; Edmund Wardle, 726 S. Griffith Park Dr., Burbank, Calif. 91506

[21] Appl. No.: 145,600

[22] Filed: May 1, 1980

[51] Int. Cl.³ .............................................. G01M 3/28
[52] U.S. Cl. .................................. 73/40.5 R; 73/496
[58] Field of Search ................... 73/49.6, 49.5, 40.5 R

[56] References Cited

U.S. PATENT DOCUMENTS

| | | | |
|---|---|---|---|
| 2,953,919 | 9/1960 | Potts | 73/49.5 |
| 2,981,331 | 4/1961 | Arterbury | 73/40.5 R |
| 2,982,125 | 5/1961 | Gilreath | 73/40.5 R |
| 3,048,998 | 8/1962 | Gilreath | 73/40.5 R |
| 3,375,703 | 4/1968 | Phillips et al. | 73/40.5 R |
| 3,420,095 | 1/1968 | Brown et al. | 73/40.5 R |
| 3,800,596 | 4/1974 | Phillips et al. | 73/40.5 R |
| 4,083,230 | 4/1978 | Rome et al. | 73/40.5 R |

Primary Examiner—Donald O. Woodiel
Attorney, Agent, or Firm—William C. Babcock

[57] ABSTRACT

An elongate hydrostatic tester that includes two longitudinally spaced resilient packers, and a pair of oppositely disposed, pivotally supported rigid wings that are spring-loaded, and which wings at all times tend to pivot outwardly from a first position in which they are substantially parallel to the tester to a second position in which they are normal thereto. The pair of wings prevents the tubing tester from dropping downwardly by gravity in a tubing string when the tester is otherwise supported in the upper portion thereof.

2 Claims, 6 Drawing Figures

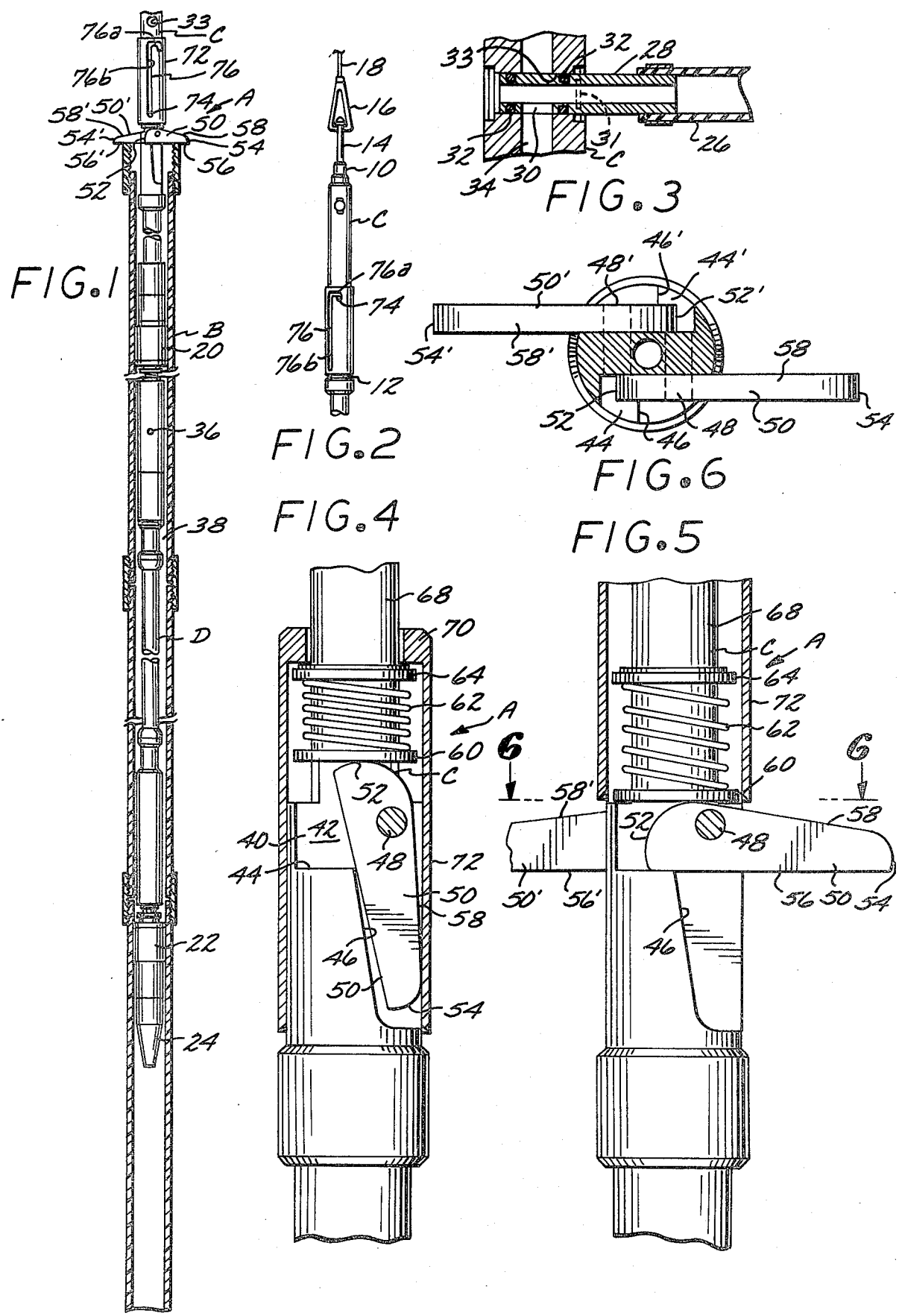

HYDROSTATIC TESTER FOR PLASTIC LINED PIPE AND FIBERGLASS PIPE

BACKGROUND OF THE INVENTION

1. Field of the Invention

Hydrostatic Tester for Plastic Lined Pipe and Fiberglass Pipe.

2. Description of the Prior Art

In the past, steel oil well pipe has been tested hydrostatically by an assembly that includes a pair of longitudinally spaced resilient packers that slidably and sealingly engage the interior surface of a stand of pipe as the latter is lowered into an oil well bore.

The assembly includes laterally spaced movable serrated slips that can be moved into forceful contact with the interior surface of the pipe, and the force exerted thereon being sufficient that the serrations actually penetrate into the metal of the pipe to removably hold the assembly at a fixed position in the pipe.

During the past few years, plastic lined oil well tubing and casing, and fiberglass tubing and casing have become increasingly popular. Such special tubing and casing like all steel tubing must be periodically tested. However, in the testing of plastic lined tubing or fiberglass, slips cannot be used as a part of the hydrostatic tester for the slips when expanded into a holding position in the pipe would penetrate the plastic lining and render the same valueless for protective purposes.

A major object of the present invention is to provide a hydrostatic oil well pipe tester, and method of using the same, in which a string of plastic lined pipe may be hydrostatically tested prior to being lowered into an oil well bore, and the testing carried out without doing damage to the plastic lining or pipe.

Another object of the present invention is to supply an oil well tubing tester that automatically assumes a self-supporting position in a vertical stand of oil well pipe when the upper portion of the tester is moved above the upper extremity of the stand of pipe.

These and other objects and advantages of the invention will become apparent from the following description of a preferred form thereof. Although the hydrostatic oil well pipe tester is particularly adapted for the testing of plastic lined oil well pipe, it may be also used on all metal oil well pipe if desired.

SUMMARY OF THE INVENTION

The hydrostatic tester of the present invention includes a pair of resilient packers that are longitudinally spaced from one another, and a pair of spring-loaded wings located at the upper portion of the tester that at all times tend to pivot outwardly from a first position where they are substantially parallel to the tester to a second position where they are substantially normal thereto. A sleeve is mounted on the upper portion of the tester and when in a first position maintains the wings in the first position. However, when the sleeve is manually moved upwardly to a second position the spring-loaded wings are free to move outwardly to the second position. When the spring-loaded wings are in the second position they prevent the tester inadvertently dropping downwardly into the pipe string in which the tester is disposed due to the force of gravity on the tester.

In using the present invention, stands of oil well pipe are sequentially tested as they are lowered into an oil well bore to make up a string of oil well pipe. After the tester has completed the hydrostatic testing of a string of oil well pipe, it is pulled upwardly by a wire line secured thereto, to a position where the pair of wings are located above the upper extremity of the stand of pipe. The pair of wings when in the second position prevent the hydrostatic tester from dropping downwardly in the pipe string. The wire line that is removably secured to the hydrostatic tester is now disconnected therefrom, and extended downwardly through the next stand of pipe to be tested. The stand of pipe through which the wire line extends downwardly is moved to a position above the string of pipe in the well bore.

The wire line is now connected to the upper portion of the hydrostatic tester, and the tester moved upwardly a slight distance above the upper extremity of the stand of pipe in the well bore. The stand of pipe to be tested is now moved downwardly relative to the pipe tester and in so doing the lower extremity of the stand of pipe to be tested pivots the pair of wings inwardly to the first position. The string of pipe to be tested is now connected to the upper extremity of the string or pipe in the well bore. The testing of the now-connected stand of pipe to the pipe string may be conducted when the stand of pipe extends upwardly above the ground surface or when the pipestring has been lowered to disposed the stand of pipe to be tested below the ground surface. After each stand of pipe is tested as above-described, the testing operation is again repeated. During the testing operation water under substantial pressure is discharged through the hydraulic tester into the confined space in the string of pipe defined between the pair of resilient packers that form a part of the hydraulic tester.

BRIEF DESCRIPTION OF THE DRAWINGS

FIG. 1 is a combined vertical cross-sectional and side elevational view of the hydraulic tester diposed in a stand of vertical pipe, and with the spring loaded wings that form a part of the hydraulic tester occupying a second position in which they support the weight of the hydrostatic tester from the top of the pipe string being tested;

FIG. 2 is a side elevational view of a upper portion of the hydrostatic tester;

FIG. 3 is a fragmentary vertical cross-sectional view of an upper portion of the tester and illustrating the means for introducing water under substantial pressure into the hydrostatic tester;

FIG. 4. is a fragmentary combined longitudinal cross-sectional view and side elevational view of the upper portion of the tester and illustrating the longitudinally movable sleeve that is disposed in a first position to maintain the pair of spring loaded wings in a first position;

FIG. 5 is the same view as shown in FIG. 4, but with the sleeve moved upwardly to a second position to allow the pair of spring loaded wings to assume a second position in which the hydrostatic tester is supported on the upper extremity of a tubing stand as shown in FIG. 1;

FIG. 6 is a transverse cross-sectional view of the hydrostatic tester taken on the line 6—6 of FIG. 5.

DESCRIPTION OF THE PREFERRED EMBODIMENT

The hydrostatic tester A that may be set to automatically assume a self-supporting position when moved to the upper portion of a string of plastic lined pipe B is shown in FIG. 1 in a supported position. The tester A includes an elongate rigid mandrel C that has an upper end 10, a lower end 12, and a fishing neck 14 projecting upwardly from the mandrel that may be removably engaged by a grab hook 16 supported on a vertically movable wire line 18. The hydrostatic tester A includes an upper resilient packer 20, a lower resilient packer 22, with the two packers being connected by a sequence of subs and tubular members referred to generally by the letter D in FIG. 1. The packer 22 has a lowered taper member 24 disposed therebelow that serves as a guide when inserting the tester in the upper end of the pipe B.

Hydrostatic tester A when in use is supplied pressurized water from a source not shown through a hose 26 that is connected to a tubular bayonet 28 that has a transverse port 30 formed therein as shown in FIG. 3, and a transverse pin 31 that acts as a stop projecting from the bayonet. A pair of sealing rings 32 are mounted on the bayonet 28 on opposite sides of the transverse port 30, and sealingly engage a transverse bore 33 formed in the upper portion of the mandrel C as shown in FIG. 3, which transverse bore is in communication with the downwardly extending longitudinal passage 34. The passage 34 continues downwardly through the tubular member that supports the upper packer 20 and terminates in a transverse pressurized water outlet 36 situated between the upper and lower packers 20 and 22 as shown in FIG. 1. When the tester A is inserted in pipe B as shown in FIG. 1 the upper and lower packers 20 and 22 cooperate with the pipe to define an annulus shaped space 38 that is subjected to pressurized water from the outlet 36 to test the span of pipe situated between the upper and lower packer.

The mandrel C includes a portion 40 above the presurized water inlet 33 in which first and second, laterally spaced, parallel sides 40 and 40' are defined that have first and second horizontal abutments 44 and 44' adjacent thereto, as well as first and second longitudinal abutments 46 and 46'.

The first and second horizontal abutments 44 and 44', and first and second longitudinal abutments 46 and 46' are oppositely disposed from one another as may be seen in FIG. 6. First and second pins 48 and 48' extend outwardly from the faces 42 and 42' in opposite directions as may be seen in FIG. 6 and serve to pivotally support first and second elongate rigid wings 50 and 50'. The first wing 50 has a first curved end 52 that serves as a cam, a second curved end 54, a first side edge 56 and second side edge 58. The second wing 50' is identical to the first wing 50 and the ends and side edges are identified by the same numbers used in conjunction with the first wing but with a prime added thereto.

A member 60 is slidably supported on the mandrel C and is at all times urged downwardly by a compressed spring 62 that abuts against a member 64, with the spring 62 at all times tending to pivot the first and second wings 50 and 50' outwardly to the position illustrated in FIG. 5.

The upper mandrel portion 68 best seen in FIG. 4 slidably supports a circular member 30 that has a tubular sleeve 72 extending downwardly therefrom. The sleeve 72 when in a first position as illustrated in FIG. 4 prevents the first and second wings 50 and 50' from being pivoted outwardly to the second position shown in FIG. 5. Upper mandrel portion 68 has a pin 74 extending outwardly therefrom that slidably engages an inverted J-shaped slot 76 formed in the sleeve 72, and the pin when in a horizontal portion 76a of the slot being held in the first position as shown in FIG. 4, but the pin in the vertical portion 76b of the slot permitting the sleeve to be raised to the second position illustrated in FIG. 5.

The use and operation of the hydrostatic tester A is as follows. After a stand B of tubing is disposed in the position to be lowered into a well bore, the hydrostatic tester A is lowered downwardly therein by a wire line 18 as shown in FIG. 2, with the sleeve 72 occupying the first position illustrated in FIG. 4. The bayonet 28 is now inserted in the recess 33, and pressurized water discharged into the annulus shaped space 30a to hydraulically test the stand of pipe.

After the testing operation is completed the pressure on the water is relieved, and the bayonet is withdrawn from the recess. The wire line 18 is now utilized to raise the hydraulic tester upwardly in the stand of pipe until the sleeve 72 is above the upper extremity thereof. The sleeve is now manually moved from the first position shown in FIG. 4 to the second position illustrated in FIG. 5 in which the wing 54 and 54' move outwardly to first to second positions, and ensure that the hydraulic tester A will not drop downwardly in the pipe when the wire line 18 has the grab hook 16 disconnected from the fishing neck 14. Should the hydraulic tester after being disconnected from the grab hook 16 tend to move downwardly in the pipe B, the lower edges 56, 56' of the first and second wings 54 and 54' will engage the upper extremity of the pipe B to prevent further downward movement of the hydrostatic tester A. The wire line 18 and grab hook 16 are now extended downwardly to the next stand of pipe to be tested, with the grab hook 16 now being again connected to the fishing neck 14. The wire line 18 is now moved upwardly slightly to allow the next stand of pipe B to be moved downwardly to be connected to the already tested stand of pipe and as such downward movement takes place the stand of pipe to be tested contacts the first edges 58 and 58' of the first and second wings 56 and 56' to pivot them inwardly from the second position shown in FIG. 5 to the first position illustrated in FIG. 4. However, the wings when in the first position in FIG. 4 will be bearing against the interior surface of the stand of pipe to be tested, for the sleeve 72 will remain in the upwardly disposed second position. The stand of pipe to be tested is tested in the manner previously described, and after the testing operation is completed, subsequent stands of pipe B are tested in the same manner until all of the stands of pipe that will be lowered into the well bore to define the pipe string have been tested. It will be apparent that when the first and second wings 56 and 56' are in the first position, and the sleeve 72 is in the second position, that the wings will automatically pivot outwardly to the second position shown in FIG. 5, when the hydrostatic tester A is moved upwardly in the string of pipe being tested for the wings to be above the uppermost extremity thereof. Due to the wings 56 and 56' automatically pivoting outwardly to the second position shown in FIG. 5 when moved above the upper extremity of the string of pipe B to be tested, the possibility of the hydrostatic tester A dropping downwardly through the string of pipe being tested is eliminated. From the above description it will be apparent that the present invention permits plastic lined pipe and fiberglass pipe to be tested hydraulically with damage being done to the interior surface portions thereof.

The use and operation of the invention has been explained previously in detail and need not be repeated.

What is claimed is:

1. In a hydrostatic tester for plastic lined and fiberglass oil well pipe, said tester of the type that includes an elongate mandrel having first and second ends, first means on said first end for removably supporting said tester from a vertically movable wire line, pipe connected longitudinally spaced upper and lower resilient packers disposed below said mandrel that define an annulus shaped confined space with the interior of said plastic lines pipe when said upper packer is disposed therein, passage means for conducting high pressure water downwardly through said mandrel to discharge from said pipe into said confined space to hydrostatically test said plastic lined and fiberglass pipe the improvement for automatically supporting said tester from the upper extremity of a substantially vertical length of said pipe when an upper portion of said mandrel is disposed thereabove and disconnected from said wire line, said improvement comprising:

a. a pair of flat, laterally spaced, parallel faces defined on the upper portion of said mandrel, and pairs of horizontal and substantially longitudinal abutments adjacent said pair of faces, and a pair of pins that extend outwardly from said faces in opposite directions and disposed above said horizontal abutments;
 b. a pair of elongate rigid wings that have first and second ends between which first and second longitudinal edges extend, said first and second ends being convexly curved, said pair of wings having transverse bores therein intermediate said first and second ends that rotatably support said pair of wings from said pins;
 c. a spring loaded member longitudinally movable on said mandrel that is at all times in pressure contact with said pair of first curved ends and tends to pivot said pair of wings outwardly on said mandrel from first positions where they are adjacent said longitudinal abutments to second positions where they are substantially normal to said mandrel and said first edges in contact with said horizontal abutments and said pair of wings when so disposed capable of resting on the upper extremity of said pipe to support said tester therein; and
 d. a tubular sleeve slidably mounted on said mandrel, said sleeve when in a first position extending downwardly over said pair of wings to maintain said pair of wings in said first position, and said sleeve when in a second position disposed above said pair of wings and allowing the latter to pivot to said second position, with said pair of wings automatically assuming said second position when said tester has said sleeve in said second position and said tester is moved upwardly in said pipe to the extent said second ends of said wings are disposed above the upper extremity of said pipe.

2. A hydrostatic tester as defined in claim 1 which in addition includes:

e. a pin that extends outwardly from said mandrel and slidably engages an inverted generally J-shaped slot that has a transverse leg and a longitudinal leg, said pin when in said transverse leg removably maintaining said sleeve in said first position, but said slot allowing said sleeve to be moved to said second position when said sleeve is rotated to dispose said pin in axial alignment with said longitudinally extending slot and said sleeve then moved upwardly to dispose the lower extremity of said slot adjacent said pin.

* * * * *